Sept. 9, 1969    D. DE GRUSSO    3,466,091
SEAT HOLDING DEVICE
Filed July 24, 1967

INVENTOR
DON DE GRUSSO

United States Patent Office 3,466,091
Patented Sept. 9, 1969

3,466,091
SEAT HOLDING DEVICE
Don de Grusso, 2353 E. 74th St.,
Brooklyn, N.Y. 11234
Filed July 24, 1967, Ser. No. 655,427
Int. Cl. B60r 21/10
U.S. Cl. 297—390          1 Claim

ABSTRACT OF THE DISCLOSURE

A seat for an automobile or the like having adjustable clamps that will grasp a person and prevent him from falling forward into a windshield or dashboard in case of a head-on collision.

SEAT HOLDING DEVICE

This invention relates generally to seats for automotive or other vehicles.

A principal object of the present invention is to provide a seat for an automobile or other vehicle, the seat having self-contained clamps adjustably secured thereupon, the clamps being provided for arresting the forward movement of a person sitting in the seat in the case of a sudden stop or an impact with another vehicle in front thereof.

Another object of the present invention is to provide a seat holding device which is readily adjustable between a retracted, non-operative position and an extended operative condition.

Yet a further object of the present invention is to provide a seat holding device which is readily adaptable for use on seats other than automotive vehicles and which is accordingly applicable to infants' highchairs, amusement park rollercoasters, aircraft seats and the like.

Still another object of the present invention is to provide a seat holding device which can be readily adjusted to accommodate persons of different heights, weight or shape.

Other objects of the present invention are to provide a seat holding device which is simple in design, inexpensive to manufacture, rugged in construction, easy to use and efficient in operation.

These and other objects will be readily evident upon a study of the following specification and the accompanying drawing wherein.

Figure 1:
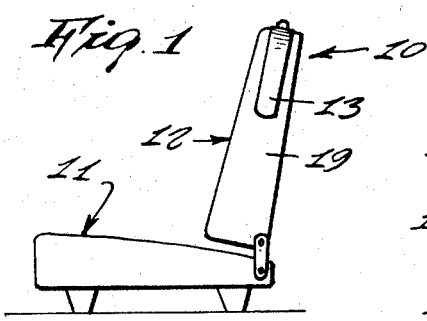
FIGURE 1 is a side elevation view of a seat incorporating the present invention.
Figure 2:
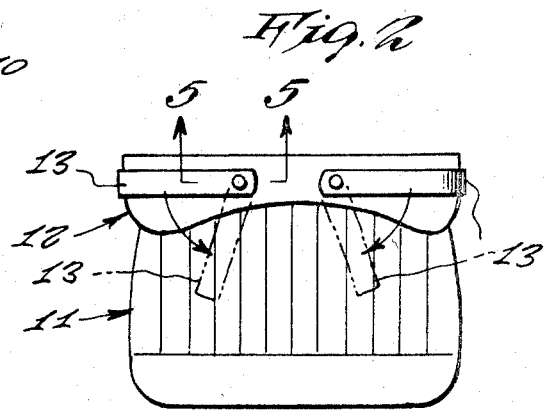
FIGURE 2 is a plan view thereof.
Figure 5:
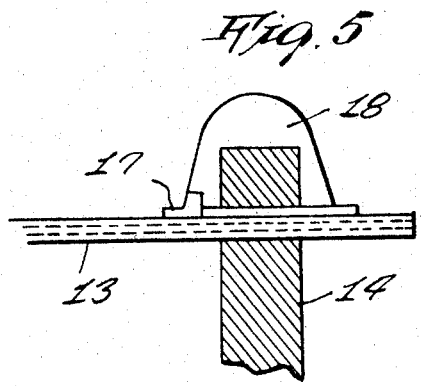
FIGURE 5 is an enlarged cross-sectional view taken on the line 5—5 of FIGURE 2.

Referring now to the drawing in detail, the reference numeral 10 represents a seat holding device, according to the present invention, wherein there is a seat 11 and a backrest 12, as is shown in FIGURES 1 and 2 of the drawing.

Figure 3:
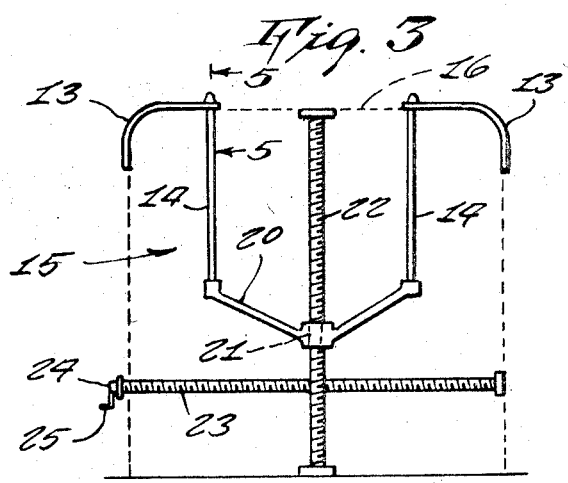
FIGURE 3 is a front view of the moveable mechanism comprising the present invention.
Figure 6:
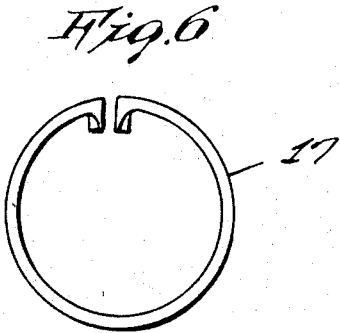
FIGURE 6 is an enlarged elevation view of a lock washer for a top nut which forms a part of the present invention.
Figure 4:
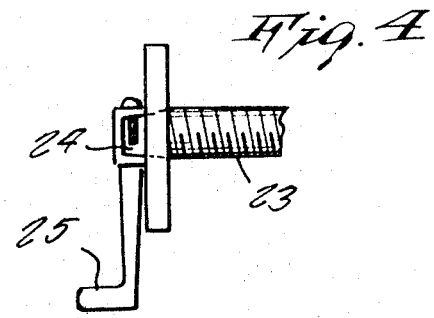
FIGURE 4 is an enlarged detailed view of structure shown in FIGURE 3 as viewed in the same plane.

A pair of clamps 13 of generally angular configuration are secured pivotably about shafts 14 that form components of a mechanism 15. The mechanism 15 is contained within the interior of the backrest 12, the upper ends of the shafts 14 protruding upwardly through the top wall 16 of the backrest 12 where the shafts are surmounted by a lock washer 17 at the base of a cap locknut 18. Accordingly with the mechanism 15 hidden within the backrest, only the cap lock nut 18 is exposed to view together with the clamps 13, each of which has a gently rounded portion which conforms to the rounded corner of the backrest against which it is placed when in a non-operative use, the clamps thus being held snug against the edge 19 of the backrest as is shown in FIGURES 1 to 3.

Each of the shafts 14 is mounted within a bracket 20 having a threaded opening 21 therein for being threadingly engaged upon a vertical shaft 22 that is screw threaded throughout its length so as to allow the bracket 20 to be raised or lowered when the screw-shaft 22 is rotated. Thus a means is provided for raising the clamps 13 so as to accommodate persons which are taller or shorter, it being understood that the clamps 13 are passed around a person's shoulders when in an operative use as is evident by the phantom lines in FIGURE 2 of the drawing.

Horizontal screw shaft 23 is threadingly engaged with the screw-shaft 22, the screw-shaft 23 being mounted horizontally in the lower part of the back rest and having one end thereof extending outwardly of the back rest, the end 24 of the screw shaft 23 being provided with a crank handle 25 for manual operation. The screw-shaft 23 is properly supported rotatably free within bearings carried within the back rest.

It is to be understood that a crank handle 25 may be provided at both ends of the screw-shaft 23 if so desired whereby a parson may manipulate the upward or downward movement of the clamps 13 from either side of the seat.

In operative use, the present invention may comprise a safety feature equivalent to an automobile safety belt, the person upon getting into the car merely swinging the clamps forwardly over his shoulders to the position as is indicated by the phantom lines in FIGURE 2. He is now safe from being thrown forwardly in case of a sudden stop or a crash. When the present invention is installed within a military airplane or the like, the person can eject out of a sitting position by merely lowering his body downwardly and out of a sitting position so as to disengage his shoulders from beneath the clamps.

While various changes may be made in the detailed construction, it is understood that such changes will be within the spirit and scope of the present invention.

I claim:

1. In a seat holding device, the combination of a seat, a backrest for said seat, and said backrest having self contained means for arresting the forward movement of a person sitting upon said seat in case of a sudden stop, said self contained means comprising a mechanism contained within said backrest, said mechanism having a pair of clamps connected thereto, said clamps being located on the outer side of said backrest and being fitted when in an inoperative use against the side edges of said backrest, each of said clamps being of generally angular configuration for being fitted around a person's shoulders so as to hold said person from being thrown forwardly when sitting upon said seat, each of said clamps being mounted pivotally free upon the upper end of shafts extending outwardly of said backrest, said shafts being carried at their lower ends upon a bracket, and said bracket being provided with a threaded opening for being threadingly engaged with a vertically extending screw shaft that is rotatable by manual means so as to permit said bracket to be raised and lowered, thereby causing said clamps to be upwardly or downwardly adjustable so as to thus accommodate persons of various heights.

References Cited

UNITED STATES PATENTS

| | | | |
|---|---|---|---|
| 893,542 | 7/1908 | Pohle | 297—384 |
| 2,136,852 | 11/1938 | Knauth | 297—390 X |
| 2,608,239 | 8/1952 | Gorden | 297—348 |
| 2,613,726 | 10/1952 | Paatero | 297—384 X |
| 2,873,122 | 2/1959 | Peras | 297—384 |
| 3,165,357 | 1/1965 | Rudemann | 297—384 |
| 3,262,716 | 7/1966 | Graham | 297—390 X |

JAMES T. McCALL, Primary Examiner

U.S. Cl. X.R.

297—191